Figure 1:
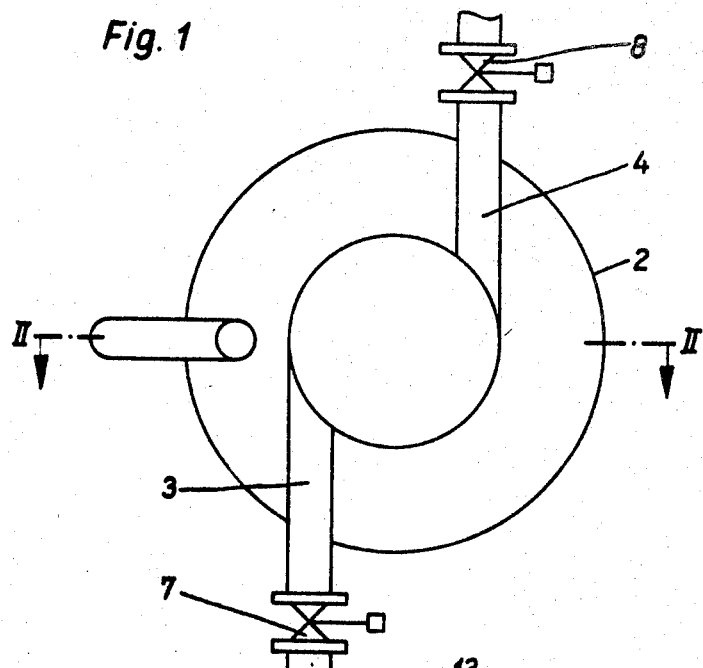

United States Patent Office 3,394,080
Patented July 23, 1968

3,394,080
METHOD AND APPARATUS FOR AUTOMATICALLY MEASURING CYANIDE CONCENTRATION AND pH VALUES AND USE IN TREATING WASTE WATERS
Robert Hoffmann, Hans-Joachim Schuster, Winfried Gruhl, Herbert Michel, and Kurt Noske, Berlin, Germany, assignors to Siemens Aktiengesellschaft, Munich, Germany, a corporation of Germany
Filed Oct. 6, 1965, Ser. No. 493,476
Claims priority, application Germany, Oct. 8, 1964,
S 93,662
11 Claims. (Cl. 210—59)

Our invention relates to measuring methods. More particularly, it relates to a method for automatically measuring the cyanide content and/or the pH value of industrial waste waters and an apparatus for carrying out such method.

A known method of determining the cyandie content and/or the pH value of industrial waste waters which it is desired to decontaminate is to employ an electrode type device which is immersed in the waste water to be processed, the use of the electrode providing magnitudes of potential which represent the cyanide content and the pH of the aforesaid water. In such known method, the electrode device is constantly immersed in the waste waters being monitored with the result that chalk deposits may form at the electrodes comprising the electrode device, thereby deleteriously affecting the operation of such device. To minimize and to perhaps even eliminate the risk of the chalk deposit formation at the electrodes, it has been known to provide the electrode device with a scraper.

The eletcrode potentials produced by the electrode device may be utilized to control the quantities of decontaminating agents added to the waste waters, the waste waters to be processed suitably being collected, for example, in a reaction chamber both for pH and cyanide content monitoring and for decontamniation where the waste waters are collected in such reaction chamber, in order to ensure complete decontamination of the waste waters, it is necessary to repeatedly measure the pH or cyanide concentration values after the addition to the waters of the decontaminating agents. Since, in this known method, the electrode device is constantly immersed in the waste waters being monitored and decontaminated during the repeated measuring, the use of the electrode device, perforce, provides a determination of a potential change which corresponds to the change in cyanide concentration resulting from the action of the added decontaminating agents. This potential change is, generally, relatively small. Consequently, based upon the sensitivity of the electrode device, which sensitivity inherently practicably cannot be increased beyond a given limit, the measurement of the cyanide and pH value of waste waters according to the known method is relatively and unsatisfactorily inaccurate.

Accordingly, it is an important object of this invention to provide a method for satisfactorily accurately measuring the pH and cyanide contents of waste water employing an electrode device.

It is another object to provide an apparatus for carrying out a method for measuring pH and cyanide content in waste waters.

It is a further object to provide an apparatus in accordance with the preceding object wherein the need for providing a scraper for the electrode device is eliminated.

These objects are achieved by providing a method comprising the following steps:

(a) Taking samples from waste waters which have been collected in a reaction chamber and respectively supplying these samples to an electrochemical analyzing device.

(b) Producing two electrical quantities as a result of the preceding step for a sample, one of these electrical quantities having a magnitude which is a function of the cyanide content of the sample and the other electrical quantity having a magnitude which is a function of the pH value of the sample;

(c) Draining the sample from the analyzing device and replacing it with pure water or with a calibration solution to condition the analyzing device for a succeeding sample to be supplied thereto.

With the above steps and in accordance with the method of the invention, since the electrochemical analyzing device is drained following the measurements of a sample and filled with relatively pure water or a calibration solution, it is ensured that the absolute values and not the changes in values of the cyanide content and the pH of the waste water samples are being determined. Since such absolute values of cyanide concentration and pH are, of necessity, always greater than mere changes in the values of cyanide concentration and pH between measurements of the same sample, i.e., before and after its treatment with decontaminating agents, the method according to the invention is self-evidently more precise than the known method described hereinabove.

Further, in accordance with the invention, the two electrical quantities produced by the electrochemical analyzing device for a sample may be employed to automatically control the decontamination and neutralization of the waste waters contained in the reaction chamber. The one of the aforesaid electrical quantities which represents the cyanide concentration is utilized to influence a device which controls the quantities of decontaminating agents added to the reaction chamber and the other of the aforesaid electrical quantities, which represents a function of the pH of the waste waters, is employed to modify the operation of a device which controls the addition of alkalizing agents into the reaction chamber.

It has been found that it is advantageous, from economic considerations, to obtain a fresh sample from the reaction chamber upon the first adding of decontaminating and alkalizing agents thereto, and to have it analyzed in the electrochemical analyzing device. With such step, there is avoided a possible over-addition of the decontaminating and alkalizing agents above the amounts required to ensure decontamination and neutralization of the waste waters in the single measuring step of the method according to the invention. In addition, in this measurement of the post-addition fresh sample, the values of the cyanide content and pH of the waste waters in the reaction chamber may be re-examined. Thus, if the magnitudes of one or both of the electrical quantities exceed chosen respective values, a further addition of either or both of the decontaminating and alkalizing agents respectively is effected as required.

To continually ensure a complete decontamination and to avoid an over-addition of decontamination and alkalizing agents, it is preferable to repeat the sample taking and its examination in the electrochemical analyzing device and to correspondingly repeat the addition to the waste water of the decontaminating and alkalizing agents as many times as is required until the waste waters in the reaction chamber are completely decontaminated and neutralized.

Since a specific pH value is required to carry out the decontamination reaction, the addition of decontaminating agents, as determined by the magnitude of the electrical value representing cyanide content, is conducted with some delay after the addition of the alkalizing agents. This ensures that the decontamination occurs after the most advantageous pH value required for decontamination has been established by the action of the alkalizing agents. It is desirable to supply an automatic program control to ensure the automatic running of the analyses of the waste waters for cyanide concentration and pH values as well as for the decontamination of the waste waters.

A given period of time has to elapse between discrete analyzing steps, such period being determined by the reaction time of the decontaminating and alkalizing agents and the waste waters in the reaction chamber. Consequently, in situations where large quantities of waste water are to be decontaminated, several reaction chambers may be utilized to contain the waste waters, a plurality of the latter but less than the total amount of chambers having electrochemical analyzing devices respectively associated therewith. With this latter arrangement, a substantial reduction in costs may be effected in a decontamination installation comprising many reaction chambers through the savings enabled by the elimination of the need for several electrochemical analyzing devices.

A measuring device is employed in the carrying out of the method, such measuring device including, according to the invention, a measuring vessel equipped with the electrochemical analyzing device. The measuring device communicates with the reaction chamber, suitably through an inlet pipe, and is connected to a line or vessel containing the calibration solution through another inlet pipe.

Generally speaking and in accordance with the invention, there is provided a method for automatically measuring the cyanide concentration and the pH of waste water comprising the steps of subjecting an electrochemical analyzing device which is capable of producing a first electrical quantity whose value is a function of cyanide concentration in and a second electrical quanity whose value is a function of the pH of an aqueous solution, to a sample of the waste water to produce the aforesaid electrical quantities having values respectively representing the concentration of cyanide in and the pH of the waste water. Thereafter, the analyzing device is freed from the sample and is then subjected to a solution which is constituted to reset the analyzing device to produce the first and second electrical quantities at chosen standard of comparison values to condition the analyzing device for subjection to a succeeding sample of the waste water.

Also in accordance with the invention, there is provided an apparatus for automatically measuring the cyanide concentration and the pH value of waste waters comprising a measuring vessel, first conduit means communicating with the vessel for enabling the receiving into the vessel of a sample of waste water and second conduit means communicating with the vessel for enabling the receiving into the vessel of a calibration solution. An electrochemical analyzing device is disposed in the vessel which is operative to produce a first electrical quantity whose value is a function of cyanide concentration and to produce a second electrical quantity whose value is a function of pH concentration. Third conduit means are included which communicate with the vessel for enabling the draining of the vessel. The electrochemical analyzing device comprises first and second electrode means for producing the first and second electrical quantities. First and second valve means are provided in the first and second conduit means respectively which are adapted to be controlled sequentially in a chosen timing cycle by automatic program control means. The electrode means have electrical leads which are adaped to be connected to devices for controlling the addition of decontaminating agents and neutralizing agents to the waste water whereby the first and second electrical quantities produced by the electrode means influence the operation of the control devices and consequently the addition of the agents to the waste water.

The foregoing and more specific objects and features of our invention will be apparent from and will be mentioned in the following description of a method and apparatus for automatically measuring cyanide concentration and pH values in waste waters taken in conjunction with the accompanying drawing.

Figure 2:
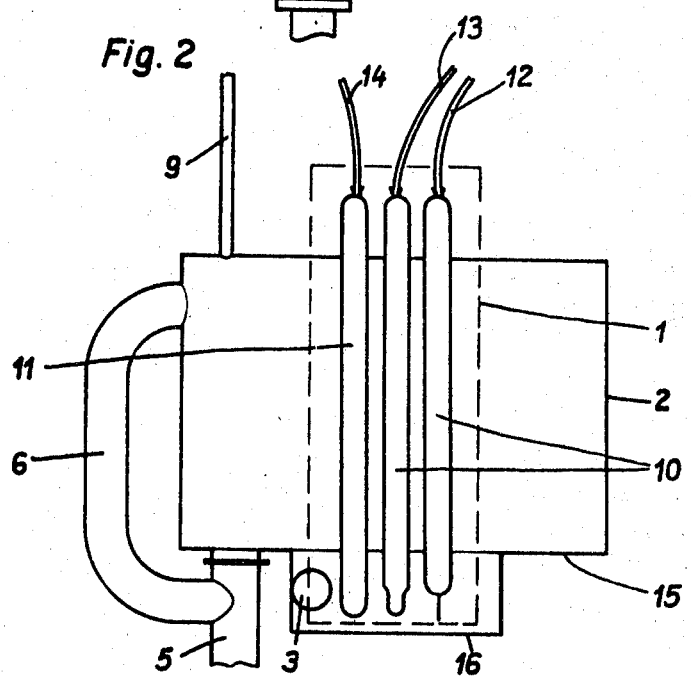

In the drawing, FIG. 1 is a bottom view of an illustrative embodiment of a cyanide concentration and pH measuring apparatus constructed in accordance with the principles of the invention; and FIG. 2 is a view taken along lines II—II of FIG. 1 looking in the direction of the arrows.

Referring now to FIGS. 1 and 2 wherein there are respectively depicted a bottom view of an illustrative embodiment of a measuring device constructed in accordance with the principles of the invention, and a view taken along lines II—II of FIG. 1 looking in the direction of the arrows, a measuring vessel 2 is equipped with an electrochemical analyzing device 1. Measuring vessel 1 suitably communicates with the reaction chamber containing the waste waters (not shown) by means of an inlet pipe 3 and is connected to a vessel or line containing a calibration solution (not shown) through an inlet pipe 4. Measuring vessel 2 is provided with an outlet pipe 5 into which there discharges an overflow tube 6, tube 6 communicating with vessel 2 near the upper edge. Inlet pipes 3 and 4 are provided with valves 7 and 8 respectively, the opening and closing of these valves being adapted to be controlled by automatic program control means (not shown). A tube 9 which communicates with vessel 2 at its upper edge is utilized for ventilating vessel 2.

The electrochemical analyzing device, as shown in FIG. 2, comprises an electrode device 10 which produces the electrical quantity which is a function of the cyanide concentration of a waste water sample and electrode 11 which produces the electrical quantity which is a function of the pH value of the waste water sample. The two electrodes comprising electrode device 10 preferably are a silver electrode and a saturated calomel (mercurous calomel) electrode respectively and the electrode comprising electrode device 11 is suitably a pH single rod electrode.

The electrodes are adapted to be connected by means of leads 12, 13 and 14 through electrical devices (not shown) such as, for example, amplifiers, to the automatic program control means. The latter means suitably contains therein valve 7 of inlet pipe 3 and valve 8 of inlet pipe 4 in addition to electrical stages which control the quantities of the decontaminating and alkalizing agents added to the waste water in the reaction chamber.

At its bottom, measuring vessel 2 is provided with a recess 16 into which the lower ends of electrodes 10 and 11 extend. Such construction and arrangement ensures that the electrodes are always maintained moist and, thereby, are prevented from drying out.

Inlet pipes 3 and 4 preferably communicate with measuring vessel 2 in the region of recess 16. Thus, in response to the openings of valves 7 and 8 respectively, the electrodes are flooded with the appropriate liquid. It is found to be advantageous for inlet pipes 3 and 4 to be attached to measuring vessel 2 in a manner such that the samples of waste water as well as the pure water or calibration solution are caused to flow into the measuring vessel in a path tangential thereto.

In the operation of the measuring device made according to the invention, a command from the automatic program control means applied to a device contained therein for controlling the movement of valve 7 in inlet pipe 3, causes valve 7 to be opened to permit the introduction into measuring vessel 2 of a sample amount of waste water contained in the waste water containing reaction chamber. After the period of time necessary to produce the electrical quantities representative of the pH and the cyanide concentration respectively of the introduced sample, such two produced electrical quantities are scanned by the automatic program control means. Valve 7 is automatically caused to be closed by the program control means and the sample of the waste water which fills in ensuring vessel 2 is drained therefrom, through pipes, pipes being automatically controlled by means not shown. Next, in response to a command from the automatic program control means to a device which controls the opening and closing of valve 8 in inlet pipe 4, valve 8 is caused to be opened to permit vessel 2 to be filled with the calibration or pure water solution. With measuring vessel 2 filled with the calibration solution, a chosen period of time is provided which is necessary to enable the electrochemical analyzing device to respond to the calibration solution and thereby to be reset at its calibrated or comparison standard setting in preparation for the receipt of the next forthcoming sample of waste water to be analyzed for pH and cyanide concentration. At the end of this last mentioned period in the program control means, there is initiated an examination of the operational capability or capacity of the electrodes. Thereafter, valve 8 is caused to be closed in a response to a command from the automatic program control means and the calibration solution is automatically caused to be drained from measuring vessel 2 through pipe 5, whereby the electrochemical analyzing device is now ready to be employed to analyze the next waste water sample.

The electrical quantities produced upon the introduction of the waste water sample into measuring vessel 2 and scanned by the automatic program control means are employed to influence the operation of the devices which control the addition of decontaminating and alkalizing agents into the reaction chamber. The program in the automatic program control means is preferably designed such that the alkalizing agents are added to the waste water containing reaction chamber prior to the adding of the decontaminating agents, the latter addition not being permitted to occur until the most favorable pH value required for the decontamination reaction has been attained.

It has been found advantageous to employ a calibration solution rather than relatively pure water if it is desired to enable continuous examination of measuring device 2 as to its operational safety. Thus, if some wear or even damage should possibly occur at one or more electrodes of the electrochemical analyzing device during its operation, then the electrical magnitudes produced by the chemical analyzing device when filled with the calibration solution would have values that would deviate from the standard values or norms that should be produced at this juncture. Such deviations may be employed to automatically actuate an annunciator or optical device, and/or to automatically interrupt the operation of the measuring device 2 and the decontamination process.

It will be obvious to those skilled in the art upon studying this disclosure that methods and apparatus for automatically measuring the cyanide concentration and/or pH values in waste waters according to our invention, permit of a great variety of modifications and hence can be given embodiments other than those particularly illustrated and described herein without departing from the essential features of our invention and within the scope of the claims annexed hereto.

We claim:

1. A method for automatically measuring the cyanide concentration and the pH value of waste water, comprising the steps of subjecting an electrochemical analyzing device which is capable of producing a first electrical quantity whose value is a function of cyanide concentration in and a second electrical quantity whose value is a function of the pH value of an aqueous solution to a sample of said waste water to produce said first and second electrical quantities having values respectively representing the concentration of cyanide in and the pH value of said waste water, thereafter freeing said analyzing device from said sample, subjecting said analyzing device to a calibrating liquid, which is constituted to reset said analyzing device to produce said first and second electrical quantities at chosen standard of comparison values to condition said analyzing device for subjection to a succeeding sample of said waste water, and then freeing said analyzing device from said liquid to condition it for receipt of a succeeding sample of waste water.

2. In a method as defined in claim 1 wherein said waste water is adapted to have added thereto decontaminating and alkalizing agents, and wherein said electrical quantities resulting from said waste water sample are adapted to be applied to devices for automatically controlling said addition of said decontaminating and neutralizing agents, said last mentioned electrical quantities being utilized to respectively influence the operation of said addition controlling devices.

3. A method as defined in claim 2 wherein a chosen time period is permitted to elapse after the addition of said decontaminating agents and said alkalizing agents to said waste water, and thereafter said chemical analyzing device is again subjected to a sample of said waste water to produce said first and second electrical quantities having values representing said cyanide concentration in and said pH value of said waste water to which said agents have been added, said last mentioned first and second electrical quantities being applied to said addition controlling devices to modify the operation of said devices.

4. A method as defined in claim 3 wherein said step of subjecting said chemical analyzing device to said waste water sample to generate said first and second electrical quantities having values to influence said addition controlling devices, said step of freeing said analyzing device from said sample, subjecting said analyzing device to said liquid to provide said first and second electrical quantities in said standard of comparison values, and said step of freeing said analyzing device from said liquid are cyclically repeated until said first and second electrical quantities produced in said analyzing device in response to its subjection to said waste water attain values substantially equal said standard of comparison values to provide an indication that said waste water is substantially decontaminated.

5. In a method as defined in claim 4 wherein the addition of said decontaminating agents to said waste water is delayed relative to said alkalizing agents to enable the preattaining of a desired pH value in said waste water for carrying out a decontamination reaction in said waste water.

6. In a method as defined in claim 5 wherein said cycling of said steps and the additions of said agents to said waste water are adapted for the control thereof by automatic program control means.

7. An apparatus for automatically measuring the cyanide concentration and the pH value of waste waters comprising a measuring vessel, first conduit means communicating with said vessel for enabling the receiving into said vessel of a sample of said waste water, second conduit means communicating with said vessel for enabling the receiving into said vessel of a calibration solution, an electrochemical analyzing device in said vesel operative to produce a first electrical quantity whose value is a function of cyanide concentration and to produce a second electrical quantity whose value is a function of pH, third conduit means communicating with said vessel for draining said vessel, said analyzing device comprising first and second electrode means for producing said first and second electrical quantities, first and second valve means provided in said first and second conduit means respectively, said valve means being adapted to be controlled sequentially in a chosen timing cycle by automatic program control means, said electrode means having electrical leads which are adapted to be connected to devices for controlling the addition of decontaminating agents and neutralizing agents to said waste water whereby said first and second electrical quantities produced by said electrode means are applied to said devices to influence the operation of said control devices and consequently the addition of said agents to said waste water.

8. An apparatus as defined in claim 7 wherein said first electrode means comprises a silver electrode and a saturated calomel electrode.

9. An apparatus as defined in claim 8, wherein said second electrode means is a pH-single-rod electrode.

10. An apparatus as defined in claim 7 wherein said measuring vessel terminates at its lower end in a recessed portion, said electrode means extending into said recessed portion.

11. An apparatus as defined in claim 10 wherein said first, second and third conduit means communicate with said measuring vessel at said recessed portion and wherein said first and second means are disposed tangentially to the periphery of said recessed portion whereby said waste water and said calibration solution are caused to flow into said vessel in a path tangential to said recessed portion.

References Cited

FOREIGN PATENTS

| | | |
|---|---|---|
| 759,109 | 10/1956 | Great Britain. |
| 895,740 | 5/1962 | Great Britain. |

OTHER REFERENCES

Manual on Industrial Water, ASTM Special Technical Publication No. 148, 1953, published by the American Society for Testing Materials, 1916 Race St., Phila. 3, Pa., pp. 317–323.

MICHAEL E. ROGERS, *Primary Examiner.*